(12) United States Patent
Seo et al.

(10) Patent No.: US 9,390,710 B2
(45) Date of Patent: Jul. 12, 2016

(54) METHOD FOR RERANKING SPEECH RECOGNITION RESULTS

(71) Applicants: SOGANG UNIVERSITY RESEARCH FOUNDATION, Seoul (KR); KANGWON NATIONAL UNIVERSITY UNIVERSITY-INDUSTRY COOPERATION FOUNDATION, Chuncheon-si (KR)

(72) Inventors: Jung Yun Seo, Seoul (KR); Sang Woo Kang, Seoul (KR); Myoung-Wan Koo, Seoul (KR); Hark Soo Kim, Seoul (KR); Hyeok Ju Ahn, Wonju-si (KR); Yeong Kil Song, Chuncheon-si (KR); Maeng Sik Choi, Samcheok-si (KR)

(73) Assignees: SOGANG UNIVERSITY RESEARCH FOUNDATION (KR); KANGWON NATIONAL UNIVERSITY UNIVERSITY-INDUSTRY COOPERATION FOUNDATION (KR)

( * ) Notice: Subject to any disclaimer, the term of this patent is extended or adjusted under 35 U.S.C. 154(b) by 0 days.

(21) Appl. No.: 14/604,991

(22) Filed: Jan. 26, 2015

(65) Prior Publication Data
US 2016/0104478 A1 Apr. 14, 2016

(30) Foreign Application Priority Data
Oct. 14, 2014 (KR) ........................ 10-2014-0138383

(51) Int. Cl.
*G10L 15/06* (2013.01)
(52) U.S. Cl.
CPC ....... *G10L 15/063* (2013.01); *G10L 2015/0635* (2013.01)

(58) Field of Classification Search
CPC .................. G10L 15/063; G10L 2015/0635
USPC .................................................. 704/230–266
See application file for complete search history.

(56) References Cited

U.S. PATENT DOCUMENTS

2015/0026106 A1* 1/2015 Oh ...................... G06F 17/3069
706/12
2015/0302083 A1* 10/2015 Simske ................ G06F 17/279
707/750

FOREIGN PATENT DOCUMENTS

| KR | 1020000032056 | 6/2000 |
| KR | 20080024911 | 3/2008 |
| KR | 20080072673 | 8/2008 |
| KR | 1020090119043 | 11/2009 |

* cited by examiner

*Primary Examiner* — Marcellus Augustin
(74) *Attorney, Agent, or Firm* — Cantor Colburn LLP

(57) ABSTRACT

Provided is a speech recognition method using machine learning, including: receiving a speech signal as an input, performing speech recognition to generate speech recognition result information including multiple candidate sentences and ranks of the respective candidate sentences; processing the multiple candidate sentences included in the speech recognition result information according to a machine learning model which is learned in advance and changing the ranks of the multiple candidate sentences to re-rank the multiple candidate sentences; and selecting the highest-rank candidate sentence among the re-ranked multiple candidate sentences as a speech recognition result. Particularly, the machine learning model is generated by: receiving the speech signal and a correct answer sentence as inputs; generating the speech recognition result information and a correct answer set; generating learning data by using the correct answer set; and performing the machine learning of changing the ranks of the candidate sentences.

4 Claims, 3 Drawing Sheets

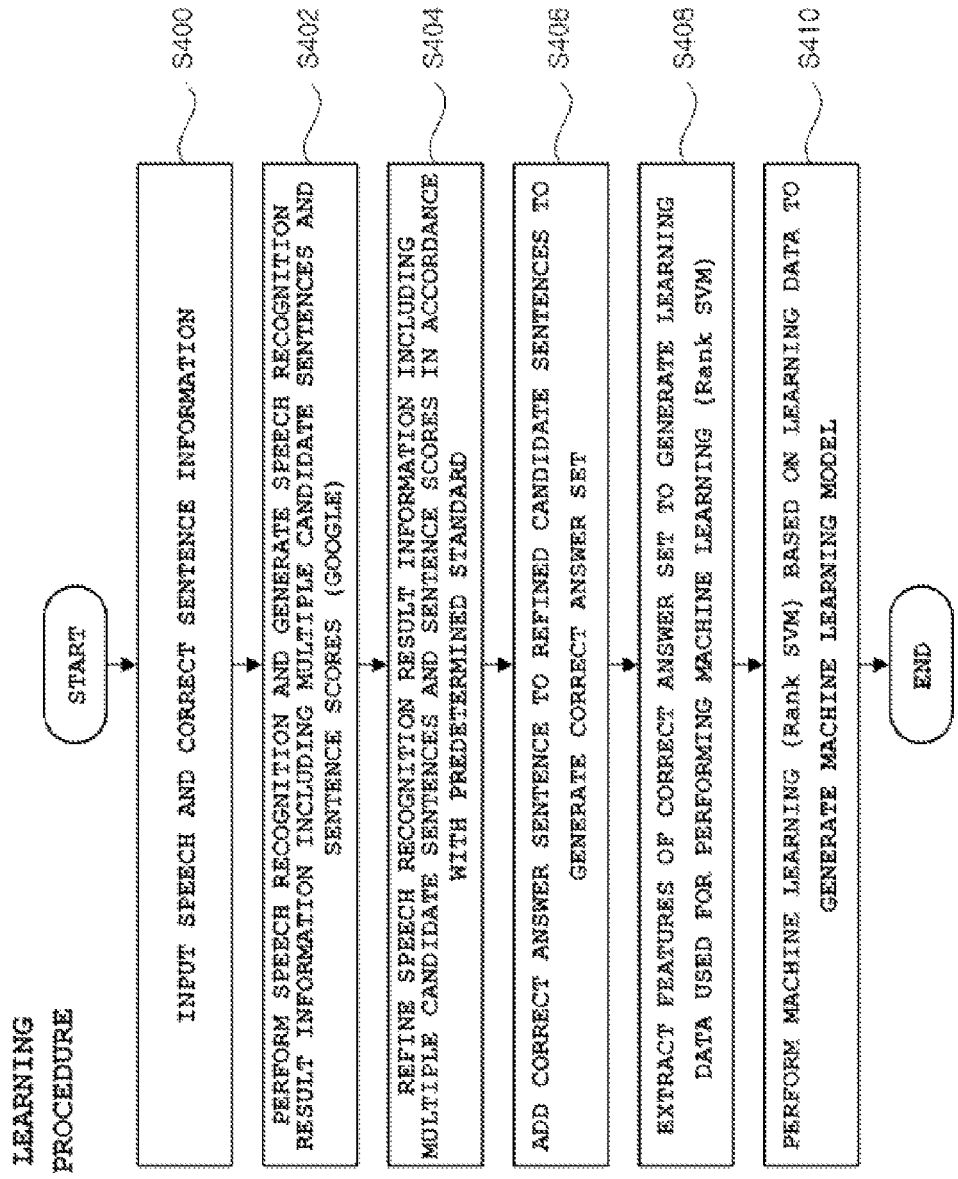

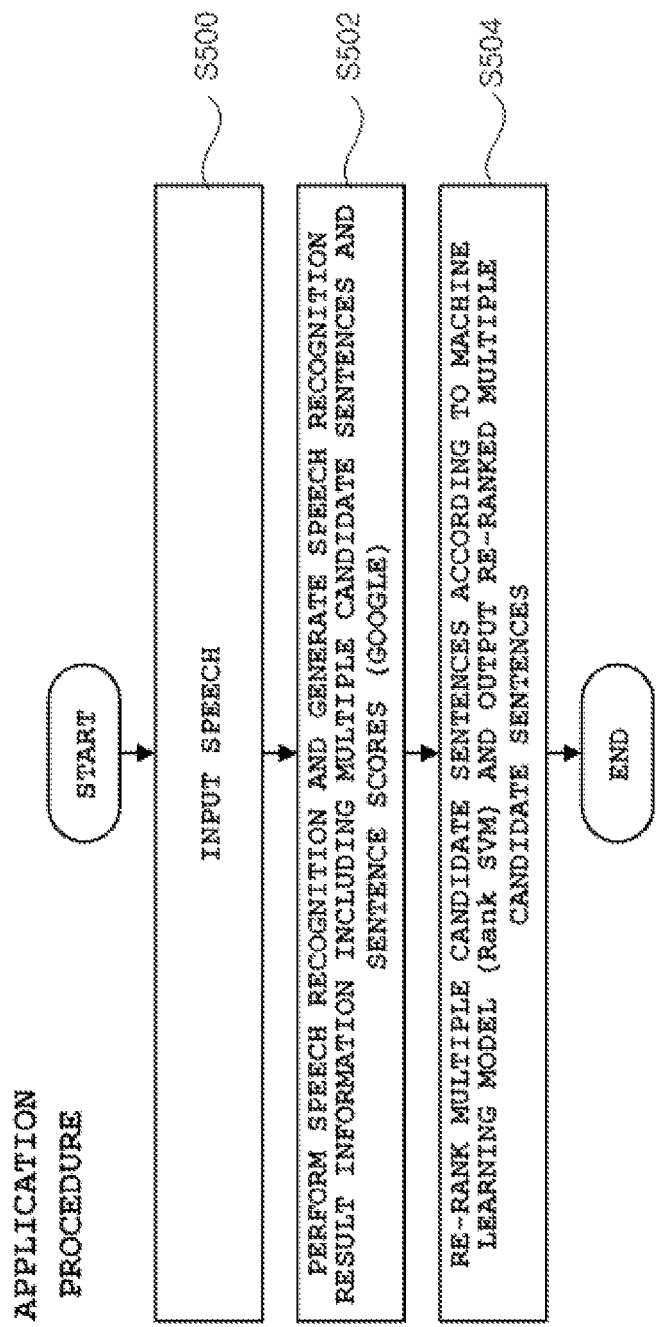

METHOD FOR RERANKING SPEECH RECOGNITION RESULTS

CROSS-REFERENCE TO RELATED PATENT APPLICATION

This application claims the benefit of Korean Patent Application No. 10-2014-0138383, filed on Oct. 14, 2014, in the Korean Intellectual Property Office, the disclosure of which is incorporated herein in its entirety by reference.

BACKGROUND OF THE INVENTION

1. Field of the Invention

The present invention relates to a speech recognition technique, and more particularly, to a speech recognition method using machine learning capable of improving performance of a spoken chatting system by re-ranking multiple candidate sentences detected as a result of speech recognition of user's speech and selecting an optimal candidate sentence as a speech recognition result.

2. Description of the Prior Art

Voice is the most common and convenient information transfer means used by human beings. Speech represented by voice is used as means for operating various devices as well as means for communication between human beings.

In recent years, speech recognition as a technique for interfacing between the human beings and the devices has been greatly required due to advances in performance of computers, development of various media, advances in signal and information processing technologies.

According to the speech recognition, when a wave pattern of an input speech signal is given, the most similar pattern is detected by comparing the input wave pattern with a reference pattern. The task of detecting the reference pattern which is most similar to the wave pattern of the input speech signal may be summarized to include a learning process of generating the reference pattern and a recognition process of recognizing the input speech signal by using the reference pattern generated in the learning process.

As an example of the speech recognition technique, Korean Patent Publication No. KR 10-2009-0119043 discloses an "interactive language learning device". The interactive language learning device disclosed in the aforementioned Patent Document is configured to include: a phrase recognition unit which counts the number of phrases existing in an input user speech signal by analyzing the user speech signal in a first dialogue level; a sentence searching unit which searches whether or not a correct answer sentence matching with the counted number of phrases exists in the first dialogue level; and a control unit which, in the case where the correct answer sentence matching with the counted number of phrases is detected, controls so as for a question sentence in a second dialogue level matching with the detected correct answer sentence to be output.

In addition, Korean Patent Publication No. KR 10-2000-0032056 discloses an "interactive learning auxiliary device and a dialogue analysis method Using the Same". The interactive learning auxiliary device is configured to include a dictionary storage unit for supplying data necessary for morpheme and syntax analysis and meanings and discourse analysis; a knowledge-based storage unit for supplying data necessary for dialogue analysis; a speech/text conversion unit for converting a speech input through a microphone into a text having the same meaning; a morpheme analysis unit, a syntax analysis unit, and a meaning interpreting unit which sequentially perform morpheme analysis, syntax analysis, and meaning analysis by comparing data output from the speech/text conversion unit with data of the dictionary storage unit; a discourse analysis unit which performs omission and substitution on the data output from the meaning interpreting unit with reference to the data of the dictionary storage unit; a dialogue manager which compares the data output from the discourse analysis unit with the data of the knowledge-based storage unit to convert the data into lower-level category information of declinable words and performs dialogue act, in-area keyword, in-area compatibility determining, database query word generating and searching, and the like; and a response generator which compares the data output from the dialogue manager with the data of the speech/text conversion unit to generate a sentence to be supplied to the user based on the dialogue act, database search results, and the in-area compatibility.

As described above, the speech recognition technique is applied to various fields such as a digital language learning device or a chatting system.

Particularly, the above-described spoken chatting system generates a response by using a pattern matching or searching method or the like based on a first-rank sentence in user speech recognition results. Therefore, there is a problem in that, if the speech-recognized first-rank sentence is a misrecognized sentence, an erroneous response is always generated. Furthermore, although the performance of the speech recognition is improved, the speech recognition does not always provide a correct recognition result.

Therefore, in the related art, development of a technique capable of improving the speech recognition result by using only simple processes is greatly demanded.

SUMMARY OF THE INVENTION

The present invention is to provide a speech recognition method using machine learning capable of improving performance of a spoken chatting system by re-ranking multiple candidate sentences detected as a result of speech recognition performed on user's voice and selecting an optimal candidate sentence as a speech recognition result.

According to an aspect of the present invention, there is provided a speech recognition method using machine learning, including: receiving a speech signal as an input, performing speech recognition to generate speech recognition result information including multiple candidate sentences and ranks of the respective candidate sentences; processing the multiple candidate sentences included in the speech recognition result information according to a machine learning model which is learned in advance and changing the ranks of the multiple candidate sentences to re-rank the multiple candidate sentences; and selecting the highest-rank candidate sentence among the re-ranked multiple candidate sentences as a speech recognition result.

In the above aspect of the present invention, the machine learning model may be generated by: receiving the speech signal and a correct answer sentence as inputs; performing the speech recognition on the speech signal to generate the speech recognition result information including the multiple candidate sentences and sentence scores representing the ranks of the respective candidate sentences; adding the correct answer sentence to the speech recognition result information to generate a correct answer set; extracting features of the candidate sentences and the correct answer sentence included in the correct answer set to generate learning data; and performing the machine learning of changing the ranks of the candidate sentences according to differences between the features of the candidate sentences and the features of the correct answer sentence based on the learning data.

According to the present invention, it is possible to obtain an effect in that it is possible to improve performance of a spoken chatting system by re-ranking multiple candidate sentences detected as a result of speech recognition performed on user's speech and selecting an optimal candidate sentence as a speech recognition result.

BRIEF DESCRIPTION OF THE DRAWINGS

The above and other features and advantages of the present invention will become more apparent by describing in detail exemplary embodiments thereof with reference to the attached drawings in which:

FIGS. 2 and 3 are flowcharts illustrating a speech recognition method according to an exemplary embodiment of the present invention.

DETAILED DESCRIPTION OF THE INVENTION

Figure 1:
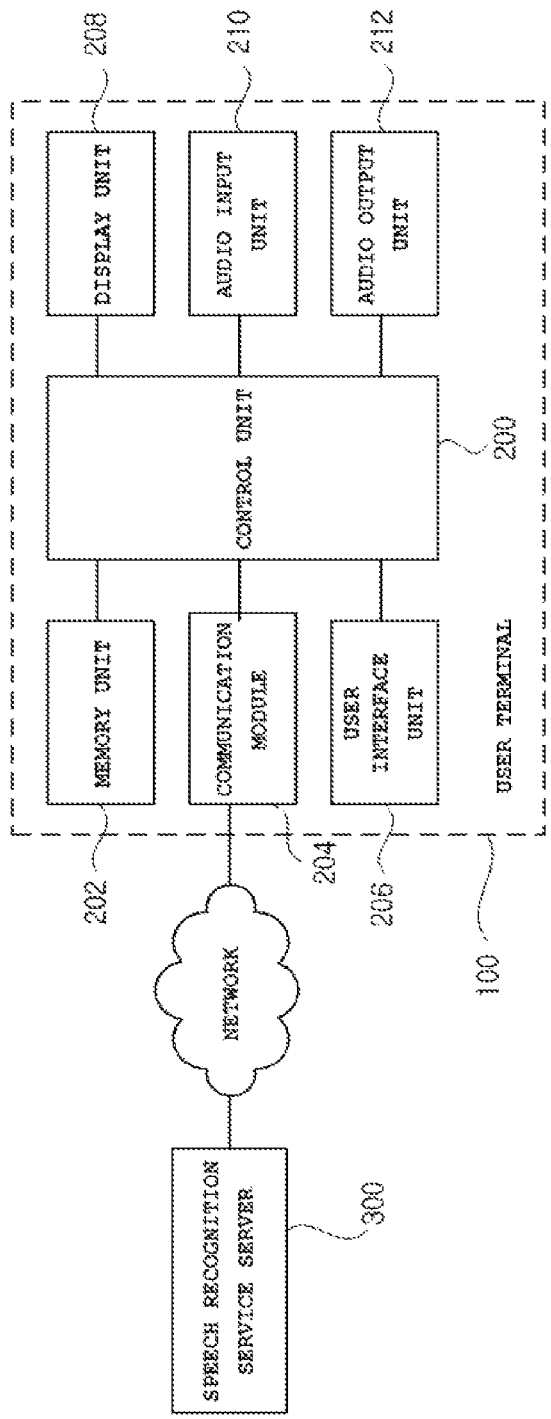
FIG. 1 is a configuration diagram illustrating a spoken chatting system according to an exemplary embodiment of the present invention.

In the present invention, it is possible to improve performance of a spoken chatting system by re-ranking multiple candidate sentences detected as a result of speech recognition performed on user's voice and selecting an optimal candidate sentence as a speech recognition result.

[Configuration of Spoken Chatting System]

A configuration of the spoken chatting system according to the present invention will be described with reference to FIG. 1.

The spoken chatting system is configured to include a user terminal 100 and a speech recognition service server 300.

The user terminal 100 receives a user's speech signal as an input and transmits the speech signal to the speech recognition service server 300. If information of a speech recognition result including multiple candidate sentences is transmitted from the speech recognition service server 300, the user terminal re-ranks the multiple candidate sentences and selects an optimal candidate sentence as a speech recognition result.

The speech recognition service server 300 receives the speech signal from the user terminal 100 and performs speech recognition. The speech recognition service server detects the multiple candidate sentences according to the speech recognition, determines a sentence score and rank of each candidate sentence, generates the speech recognition result including the multiple candidate sentences and the corresponding sentence scores and ranks, and returns the speech recognition result to the user terminal 100. As the speech recognition service server 300, there is a Google speech recognition server or the like.

The user terminal 100 is configured to include a control unit 200, a memory unit 202, a communication module 204, a user interface unit 206, a display unit 208, an audio input unit 210, and an audio output unit 212.

The control unit 200 overall controls the components of the user terminal 100 and generates a Rank SVM (Support Vector Machine) model as a machine learning model according to the exemplary embodiment of the present invention, and fulfills a speech recognition function using the machine learning model.

The memory unit 202 stores various types of information including a control program of the control unit 200 and particularly stores the Rank SVM model as a machine learning model according to the present invention.

The communication module 204 undertakes communication between the control unit 200 and the speech recognition service server 300.

The user interface unit 206 receives various commands and information as an input from a user and transfers the commands and information to the control unit 200. Particularly, the user may input a correct answer sentence through the user interface unit 206.

The display unit 208 displays information and guides under the control of the control unit 200.

The audio input unit 210 transmits a speech signal according to the speech input by the user to the control unit 200.

The audio output unit 212 outputs information under the control of the control unit 200.

[Procedure of Speech Recognition Method]

A speech recognition method which is applicable to the spoken chatting system according to the exemplary embodiment of the present invention will be described in detail with reference to FIGS. 2 and 3.

[Learning Procedure]

FIG. 2 is a flowchart illustrating a learning procedure of generating a machine learning model (Rank SVM) for detecting an optimal candidate sentence from the speech recognition result according to the exemplary embodiment of the present invention.

The user terminal 100 receives speech and correct answer sentence information as an input from the audio input unit 210 through the user interface unit 206 (step 400).

Next, the user terminal 100 transmits the speech signal to the external speech recognition service server 300 to request the speech recognition service server to perform the speech recognition and receives the speech recognition result according to the request, or the user terminal receives speech as an input and performs the speech recognition to generate the speech recognition result (step 402). Herein, as the external speech recognition service server 300, there is a Google speech recognition server or the like.

In addition, the speech recognition result includes multiple candidate sentences and sentence scores of the respective candidate sentences.

TABLE 1

| Speech recognition Result | | |
|---|---|---|
| Candidate Sentence | Sentence Score | Rank |
| First Candidate Sentence | First Sentence Score | First Rank |
| Second Candidate Sentence | Second Sentence Score | Second Rank |
| Third Candidate Sentence | Third Sentence Score | Third Rank |
| ... | ... | ... |

Table 1 illustrates a configuration of the speech recognition result. For example, the sentence scores and ranks are extracted from the Google speech recognizer. In the present invention, if a candidate sentence has a sentence score of 0.5 or more, the candidate sentence is determined to be a candidate sentence that is likely to be a correct answer.

The user terminal 100 estimates the candidate sentence of which sentence score is equal to or higher than a predetermined value among the speech recognition result including the multiple candidate sentences as the correct answer (step 404).

The user terminal 100 generates correct answer set by adding correct answer sentence information to the candidate sentences estimated as correct answers (step 406). Table 2 illustrates the correct answer set.

TABLE 2

Correct Answer set

| Candidate Sentence Estimated as Correct Answer | Sentence Score | Rank | Correct Answer Sentence Information |
|---|---|---|---|
| First Candidate Sentence | First Sentence Score | First Rank | Correct Answer Sentence Information |
| Second Candidate Sentence | Second Sentence Score | Second Rank | Correct Answer Sentence Information |
| Third Candidate Sentence | Third Sentence Score | Third Rank | Correct Answer Sentence Information |

If the correct answer set is generated, the user terminal 100 extracts features of the candidate sentences and correct answer sentences included in the correct answer set to generate learning data with which the machine learning (Rank SVM) can be performed (step 408). The features for performing the machine learning (Rank SVM) include (1) ASR (Automatic Speech Recognition) rank, (2) sentence score of ASR highest-rank candidate sentence, (3) morpheme bigram, (4) POS (Part of Speech) bigram, (5) number of domain dictionary unregistered words, (6) morpheme/POS of domain dictionary unregistered word, (7) number of general dictionary unregistered words, (8) morpheme/POS of general dictionary unregistered word.

A domain dictionary and a general dictionary will be described before the feature information for performing the machine learning (Rank SVM) is described.

In the present invention, the domain dictionary is obtained by extracting substantive words, declinable words, and unregistered words from 13,000 sentences selected by excluding 1,000 sentences of experiment data from 14,000 sentences of experiment data, and the general dictionary is obtained by extracting substantive words, declinable words, and unregistered words from "Sejong Corpus" and "Twitter" data.

The ASR rank is a rank of a candidate sentence acquired as a result of the Google speech recognizer. As described with respect to the ASR rank, the score of the ASR highest-rank candidate sentence is extracted from the candidate sentence of which candidate sentence rank is the first rank. The morpheme bigram is acquired by performing the morpheme analysis on the candidate sentences and dividing the extracted morphemes into a bigram. The POS bigram is acquired by performing the morpheme analysis on the candidate sentences and dividing the extracted POSs into a bigram. The number of domain dictionary unregistered words is obtained by extracting the substantive words and the declinable words extracted from the results of the morpheme analysis and adding the number of features if the words do not exist in the dictionary. The domain dictionary unregistered word morpheme/POS is obtained by extracting the substantive words and declinable words extracted from the results of the morpheme analysis and adding the features of the morpheme/POS if the words do not exist in the dictionary. The number of general dictionary unregistered words is obtained by extracting the substantive words and declinable words extracted from the results of the morpheme analysis and adding the number of features if the words do not exist in the dictionary. In addition, the general dictionary unregistered word morpheme/POS is obtained by extracting the substantive words and declinable words extracted from the results of the morpheme analysis and adding the features of the morpheme/POS if the words do not exist in the dictionary.

As described above, if the learning data are generated by extracting the feature information, the user terminal performs the machine learning (Rank SVM) based on the learning data to generate the machine learning model (step 410).

The machine learning (Rank SVM) detects a difference in feature information between the candidate sentences and the correct answer sentences and generates the machine learning model where the ranks of the candidate sentences can be varied according to the difference.

For example, as listed in Table 3, the ranks of the candidate sentences can be changed.

TABLE 3

Rank-Changed Information

| Candidate Sentence Estimated as Correct Answer | Sentence Score | Rank | Changed Rank |
|---|---|---|---|
| First Candidate Sentence | First Sentence Score | First Rank | Second Rank |
| Second Candidate Sentence | Second Sentence Score | Second Rank | First Rank |
| Third Candidate Sentence | Third Sentence Score | Third Rank | Third Rank |

Therefore, in the machine learning model according to the present invention, if the first to third candidate sentences are input according to the user speech recognition, the ranks of the first to third candidate sentences are changed into variable ranks, so that the rank of the candidate sentence closer to the correct answer sentence can have the highest rank.

In addition, in the extraction of the feature information, the rank and score of the candidate sentence are employed without change, and with respect to the candidate sentence itself, only the result of the morpheme analysis is employed. The above-described information of the rank and score and the above-described information of features of the morpheme and the like are refined so as to be understandable by the machine learning model, and after that, the machine learning is performed, and the ranks of the sentences can be varied.

[Application Procedure]

FIG. 3 is a diagram illustrating an application procedure where the machine learning model according to the exemplary embodiment of the present invention is applied to detect the optimal candidate sentence from the speech recognition results.

The user terminal 100 receives the speech signal as an input from the user (step 500).

Next, the user terminal 100 transmits the input speech signal to the external speech recognition service server 300 to request the speech recognition service server to perform the speech recognition. Next, the user terminal receives the speech recognition result information transmitted from the speech recognition service server 300 according to the request or independently performs the speech recognition to generate the speech recognition result information (step 502). The speech recognition result information includes multiple candidate sentences and sentence scores and ranks of the respective candidate sentences.

Next, the user terminal 100 applies the machine learning model (Rank SVM) generated according to the present invention to the multiple candidate sentences to re-rank the multiple candidate sentences by varying the ranks of the multiple candidate sentences so that the optimal candidate sentence information has the highest rank, and the user terminal selects the highest-rank candidate sentence information as a speech recognition result (step 504).

In the above-described exemplary embodiment of the present invention, it is disclosed that the user terminal 100 requests the external speech recognition service server 300 to perform the speech recognition and receives the result of the speech recognition. However, it is obvious to the ordinarily skilled in the art that the user terminal 100 may also independently perform the speech recognition. In addition, in the above-described exemplary embodiment of the present invention, it is disclosed that the Rank SVM is employed as the machine learning model. However, it is obvious to the ordinarily skilled in the art that various machine learning models can be employed in the present invention.

What is claimed is:

1. A speech recognition method using machine learning, comprising:
    receiving a speech signal as an input, performing speech recognition to generate speech recognition result information including multiple candidate sentences and ranks of the respective candidate sentences;
    processing the multiple candidate sentences included in the speech recognition result information according to a machine learning model which is learned in advance and changing the ranks of the multiple candidate sentences to re-rank the multiple candidate sentences; and
    selecting a highest-rank candidate sentence among the re-ranked multiple candidate sentences as a speech recognition result,
    wherein the machine learning model is generated by:
    receiving the speech signal and a correct answer sentence as inputs;
    performing the speech recognition on the speech signal to generate the speech recognition result information including the multiple candidate sentences and sentence scores representing the ranks of the respective candidate sentences;
    adding the correct answer sentence to the speech recognition result information to generate a correct answer set;
    extracting features of the candidate sentences and the correct answer sentence included in the correct answer set to generate learning data; and
    performing the machine learning of changing the ranks of the candidate sentences according to differences between the features of the candidate sentences and the features of the correct answer sentence based on the learning data, and
    wherein the features include speech recognition ranks, a sentence score of the highest-rank candidate sentence, a morpheme bigram, a POS (part of speech) bigram, the number of domain dictionary unregistered words, morphemes/POSs of domain dictionary unregistered words, the number of general dictionary unregistered words, and morphemes/POSs of general dictionary unregistered words.

2. The speech recognition method according to claim 1, wherein the machine learning is a Rank SVM.

3. The speech recognition method according to claim 1,
    wherein the correct answer set includes a portion of the multiple candidate sentences, and
    wherein the portion of the multiple candidate sentences are candidate sentences of which sentence scores are equal to or higher than a predetermined sentence score among the candidate sentences included in the speech recognition result information.

4. The speech recognition method according to claim 1, wherein the speech recognition result information is transmitted from a predetermined external speech recognition service server.

* * * * *